(12) United States Patent
Miller et al.

(10) Patent No.: US 8,257,881 B2
(45) Date of Patent: Sep. 4, 2012

(54) COMPLIANT FEED REGION IN STAMPED METAL FLOWFIELD OF A FUEL CELL PLATE TO ELIMINATE BIAS

(75) Inventors: Daniel P Miller, Victor, NY (US); Jeffrey A. Rock, Fairport, NY (US); William H. Pettit, Rochester, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 915 days.

(21) Appl. No.: 12/175,511

(22) Filed: Jul. 18, 2008

(65) Prior Publication Data

US 2010/0015505 A1   Jan. 21, 2010

(51) Int. Cl.
*H01M 4/64* (2006.01)
*H01M 8/04* (2006.01)
(52) U.S. Cl. ............... 429/518; 429/514; 429/457
(58) Field of Classification Search ........... 429/400–535
See application file for complete search history.

(56) References Cited

U.S. PATENT DOCUMENTS

| 3,623,913 | A  | * | 11/1971 | Adlhart et al. | 429/434 |
| 6,255,012 | B1 | * | 7/2001 | Wilson et al. | 429/514 |
| 7,087,337 | B2 | * | 8/2006 | Trabold et al. | 429/508 |

FOREIGN PATENT DOCUMENTS

| DE | 102005046795 A1 | 4/2007 |
| DE | 102007007392 A1 | 8/2007 |
| JP | 2006228533 A | 8/2006 |

OTHER PUBLICATIONS

Machine Translation of JP 2006-228533 originally published in 2006 to Takaichi et al.*

* cited by examiner

*Primary Examiner* — Basia Ridley
*Assistant Examiner* — Jonathan G Leong
(74) *Attorney, Agent, or Firm* — Fraser Clemens Martin & Miller LLC; J. Douglas Miller

(57) ABSTRACT

A fuel cell plate assembly is disclosed that comprises a first plate having a plurality of protuberances formed in a bottom of flow channels formed thereon, wherein the protuberances abut a bottom of flow channels formed on a second plate when the first plate and the second plate are disposed adjacent one another.

20 Claims, 4 Drawing Sheets

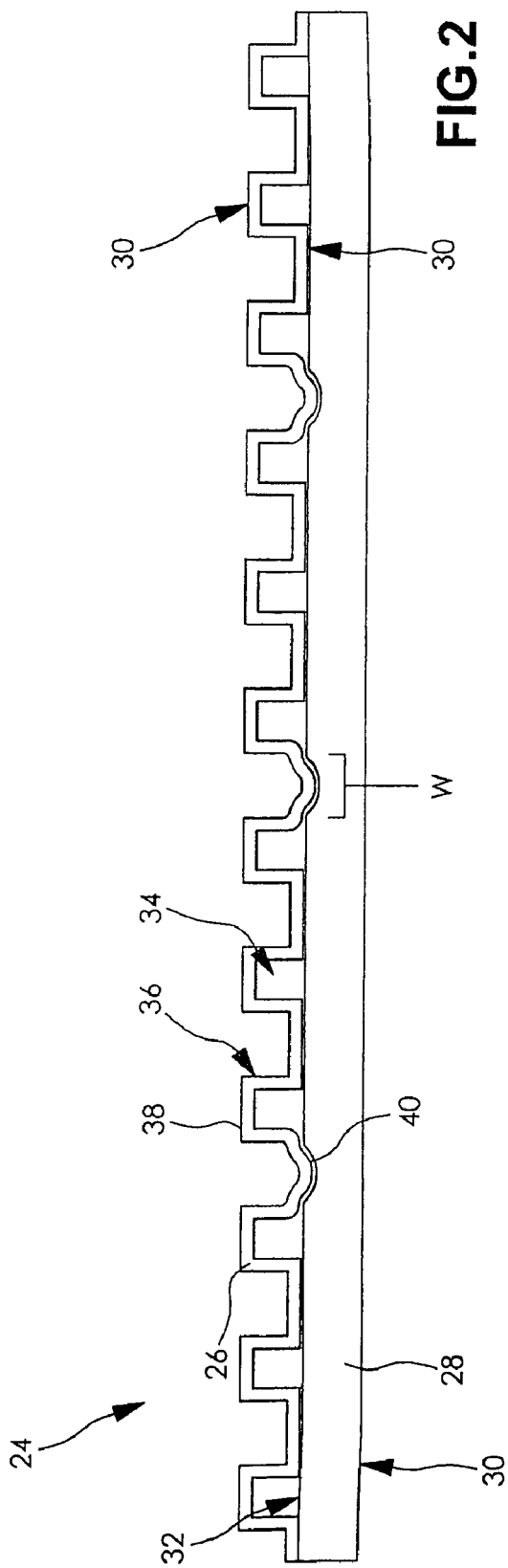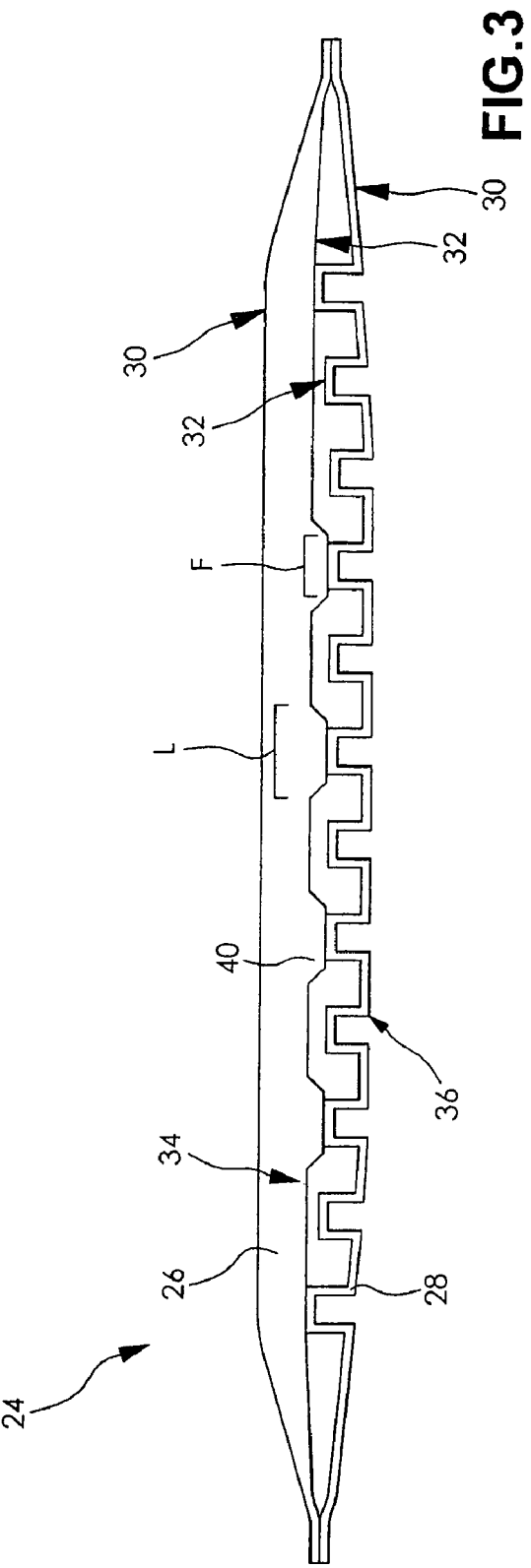

COMPLIANT FEED REGION IN STAMPED METAL FLOWFIELD OF A FUEL CELL PLATE TO ELIMINATE BIAS

FIELD OF THE INVENTION

The invention relates to a fuel cell plate, and more particularly to a bipolar fuel cell plate assembly formed from a first plate having a plurality of protuberances formed in a bottom of flow channels formed thereon, wherein the protuberances abut a bottom of flow channels formed on a second plate when the first plate and the second plate are disposed adjacent to one another.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen (or a gas containing hydrogen) is supplied to an anode side of the fuel cell and oxygen is supplied as an oxidant to a cathode side. The oxygen can be either a pure oxygen ($O_2$) or air. PEM fuel cells include a membrane electrode assembly (MEA) having a thin, proton transmissive, non-electrically conductive, solid polymer electrolyte membrane having the anode catalyst on one face and the cathode catalyst on the opposite face. If a diffusion medium (DM) and/or a barrier layer is bonded to the MEA and optionally sealed with a gasket as a unit, the unit is known as a unitized electrode assembly (UEA). To form a single fuel cell, a MEA or a UEA is disposed between two bipolar plate assemblies.

Bipolar plate assemblies include an anode plate and a cathode plate for adjacent fuel cells in the fuel cell stack. Flow channels are provided on the anode side of the bipolar plate assemblies to facilitate the flow of hydrogen to the anode side of each MEA. Flow channels are provided in the cathode side of the bipolar plate assemblies to facilitate the flow of oxygen to the cathode side of the MEA or UEA. The bipolar plate assemblies are made of a conductive material, such as stainless steel, so that they conduct the electricity generated by the fuel cells. Additionally, the individual anode and cathode plates forming bipolar fuel cell plate assemblies typically define coolant flow channels therebetween to facilitate the flow of a cooling fluid therethrough to cool the fuel cell.

A plurality of individual cells are typically bundled together to form a fuel cell stack and are commonly arranged in electrical series. Each cell within the stack may include a UEA, and each UEA provides an increment of voltage. A group of adjacent cells within the stack is referred to as a cluster. A typical arrangement of multiple cells in a stack is shown and described in commonly owned U.S. Pat. No. 5,763,113, hereby incorporated herein by reference in its entirety. The fuel cell stack receives a cathode input gas such as oxygen, typically a flow of air forced through the stack by a compressor. Some of the oxygen is consumed by the stack and some of the oxygen is output as a cathode exhaust gas that may include water as a stack by-product. The fuel cell stack also receives an anode hydrogen input gas that flows into the anode side of the stack.

In fuel cells and fuel cell stacks, it is necessary, upon assembly, for the fuel cell stack to be compressed. The compression load is typically carried by diffusion media (DM) of the UEA in an active area of the fuel cell plate to reduce the electrical contact resistance between the DM and the fuel cell plates. To ensure that the DM carry the compression load, clearance gaps between the bipolar plate assemblies and membranes or shims/subgaskets in the non-active feed regions are required. Due to variations in tolerances in component thicknesses, the clearance gaps in the non-active feed regions may vary between fuel cells, thereby producing variations in the heights of the reactant channels whereby reactant flow may be affected. Furthermore, the clearance gap may allow the UEA to shift from side to side between adjacent fuel cell plates due to differences in reactant pressures, thereby further effecting reactant flow. To control clearance gaps to provide reactant flow uniformity and pressure within the fuel cell stack, the coolant flow is caused to flow at a pressure above the pressure of the reactant flow in an amount sufficient to expand the feed regions of adjacent fuel cell plates to contact the UEA disposed therebetween to militate against the movement thereof.

It would be desirable to develop a fuel cell assembly with an improved means for properly aligning adjacent fuel cell plates and a UEA disposed therebetween to maximize the reactant flow across the fuel cell plates.

SUMMARY OF THE INVENTION

Concordant and congruous with the present invention, a fuel cell assembly with an improved means for properly aligning adjacent fuel cell plates and a UEA disposed therebetween to maximize the reactant flow across the fuel cell plates, has surprisingly been discovered.

In one embodiment, the bipolar fuel cell plate comprises a first plate having a first surface with a plurality of flow channels formed thereon and a second surface; a second plate having a first surface with a plurality of flow channels formed thereon and a second surface; a plurality of protuberances formed in a bottom of the flow channels of the first plate, wherein the protuberances abut a bottom of the flow channels of the second plate when the first plate and the second plate are disposed adjacent one another.

In another embodiment, the bipolar fuel cell plate assembly comprises a first plate having a first surface with a plurality of flow channels formed thereon and a second surface; a second plate having a first surface with a plurality of flow channels formed thereon and a second surface; a plurality of protuberances formed in a bottom of the flow channels of the first plate, the protuberances having a length greater than a width, wherein the protuberances abut a bottom of the flow channels the second plate when the first plate and the second plate are disposed adjacent one another.

In another embodiment, the bipolar fuel cell plate comprises a first plate having a first surface with a plurality of flow channels formed thereon and a second surface; a second plate having a first surface with a plurality of flow channels formed thereon and a second surface; a plurality of protuberances formed in a bottom of the flow channels of the first plate, the protuberances having a length greater than a width, wherein the protuberances abut a bottom of the flow channels the second plate when the first plate and the second plate are disposed adjacent one another.

DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 2 is a cross sectional view of one of the bipolar plate assemblies shown in FIG. 1 taken along line 2-2;

FIG. 3 is a cross sectional view of one of the bipolar plate assemblies shown in FIG. 1 taken along line 3-3;

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner.

Figure 1:
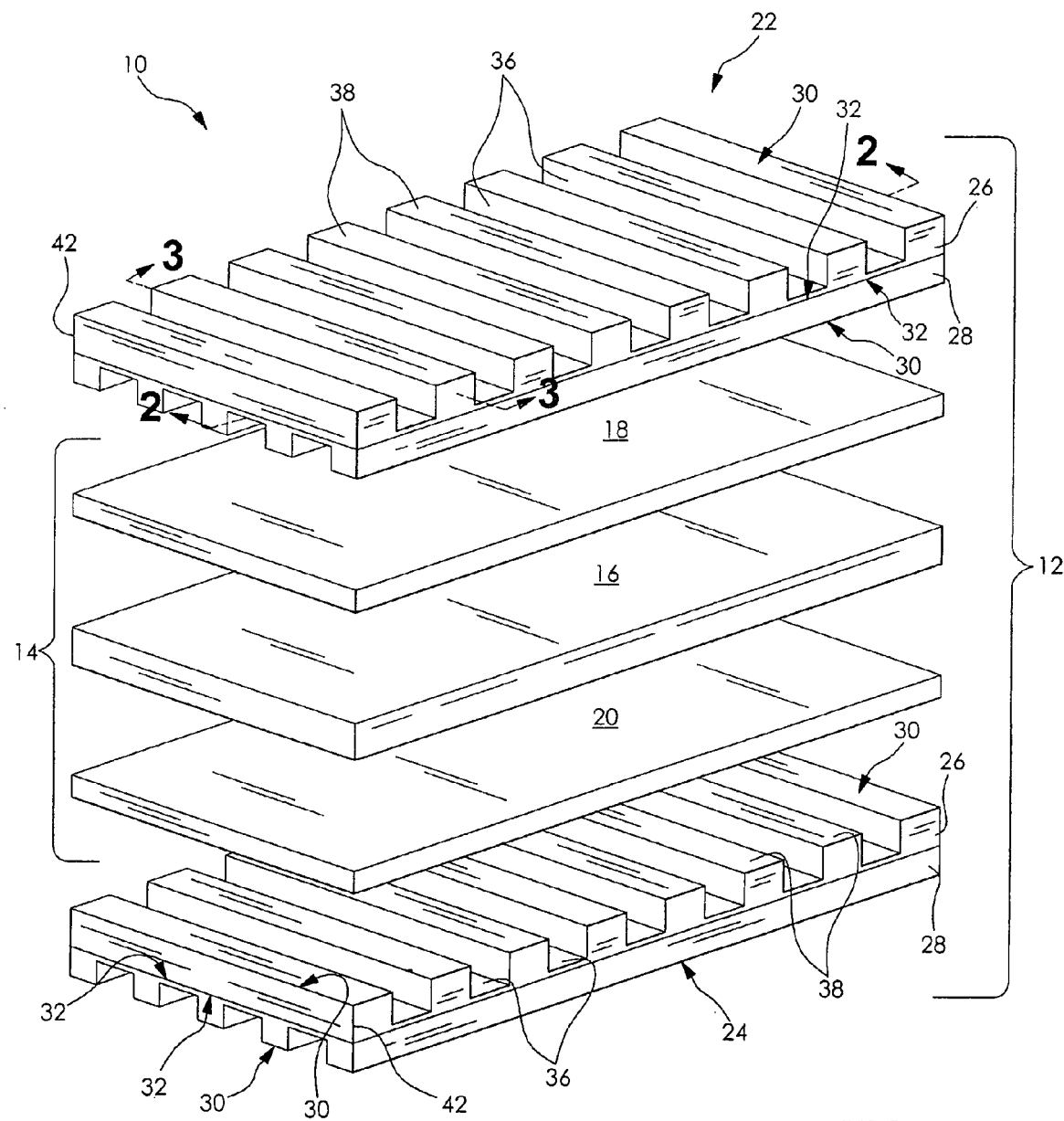
FIG. 1 is an exploded perspective view of a fuel cell stack including a plurality of bipolar fuel cell plate assemblies according to an embodiment of the invention.

FIG. 1 is a of a fuel cell assembly 10 including a single electricity producing fuel cell 12. Although the fuel cell 12 includes a pair of bipolar plate assemblies 22, 24, it is understood that other fuel cell types and configurations can be used without departing from the scope and spirit of the invention. It is also understood that the fuel cell assembly 10 may have any number of fuel cells and fuel cell plates, as desired.

The fuel cell 12 of the fuel cell assembly 10 includes a unitized electrode assembly (UEA) 14. The UEA 14 includes a proton exchange membrane (PEM) 16 having a barrier layer (not shown) on each side thereof disposed between an anode 18 and a cathode 20. The anode 18 is disposed between the PEM 16 and the first bipolar plate assembly 22, while the cathode 20 is disposed between the PEM 16 and the second bipolar plate assembly 24. It is understood that the UEA 14 may include diffusion media (DM), as desired. It is further understood that the components of the UEA 14 May be separate components rather than being a combined unit, as desired. The UEA 14 is disposed between the first bipolar plate assembly 22 and the second bipolar plate assembly 24, which act as current collectors for the fuel cell 12.

As shown in FIGS. 1-3, the bipolar plate assemblies 22, 24 are formed from a pair of the plates 26, 28. In the embodiment shown, the plates 26 are cathode plates, and the plates 28 are anode plates. Each of the plates 26, 28 has a first surface 30 and a second surface 32. The first surfaces 30 of the plates 26, 28 include a plurality of flow channels 36 formed thereon with lands 38 formed between adjacent flow channels 36. In the embodiment shown, the flow channels 36 are substantially linear. However, the flow channels 36 may be substantially undulated, serpentine, or have other configurations, as desired. Outer peripheral edges 42 of the second surfaces 32 of the plates 26, 28 are bonded together to form coolant channels 34 between the plates 26, 28. The plates 26, 28 may be bonded together by any conventional means such as by welding or by the application of an adhesive, for example. The plates 26, 28 may be unbonded with the plates 26, 28 disposed adjacent one another to form the coolant channels 34 therebetween, as desired. The plates 26, 28 may be formed from any conventional material such as graphite, a carbon composite, and a stamped metal, for example.

The second surfaces 32 of the plates 26 have a plurality of protuberances 40 formed thereon. If the plates 26 are formed from a metal, the protuberances 40 are formed in a bottom of the flow channels 36 of the plates 26 during a stamping process of the sheet metal forming the plates 26, or the protuberances 40 may be formed on the plates 26 after the formation thereof. For non-metal plates 26, the protuberances 40 are formed on the bottom of the flow channels 36 after the plates 26, 28 are formed. A longitudinal axis of the protuberances 40 is substantially parallel to a longitudinal axis of each of the flow channels 36 of the plates 26. The protuberances 40 extend from the bottom of the flow channels 36 into the coolant channels 34 formed between the plates 26, 28. In the embodiment shown in FIGS. 2-4, the protuberances 40 have a substantially trapezoidal shape and a length L greater than a width W. It is understood that the protuberances 40 may have any shape as desired. In the embodiment shown in FIGS. 2-4, the length L of the protuberances 40 is approximately 1.930 mm, the width W of the protuberances 40 is substantially equal to the width of the flow channels 36. The protuberances 40 include a flat portion F with a length of 1.150 mm. It is understood that any number of protuberances 40 may be formed on the plates 26 and at any length, width, or flat portion length, as desired. For example, the length L of the protuberances may be minimized to approximately 0.20 mm, as desired. Furthermore, while the protuberances 40 are formed on the plates 26, the protuberances 40 may also be formed on the plates 28, as desired.

As shown in FIGS. 1-3, when the outer peripheral edges 42 of the plates 26, 28 are aligned prior to the bonding thereof, the flow channels 36 formed on the first surface 30 of the plate 26 are substantially perpendicular to the flow channels 36 formed on the first surface 30 of the plate 28.

As best illustrated in FIG. 2, the bottoms of the flow channels 36 on the second surface 32 of the plate 28 abut the protuberances 40 of the plate 26. As best illustrated in FIG. 3, the longitudinal axis of each of the protuberances 40 is substantially perpendicular to the longitudinal axis of each of the bottoms of the flow channels 36 on the second surface 32 of the plate 28. As the outer peripheral edges 42 are bonded together or compressed together during assembly of the fuel cell assembly 10, the protuberances 40 abut the bottom of the flow channels 36 of the second surface 32 of the plate 28 perpendicular thereto, thereby exerting a force on the second surface 32 of the plate 28 and deflecting the unbonded portion of the plate 28 outwardly and away from the protuberances 40. Simultaneously, the second surface 32 of the plate 28 exerts a force on the protuberances 40, thereby deflecting the unbonded portion of the plate 26 outwardly and away from the plate 28. The geometry of the protuberances 40 may be designed to result in an increasing force-deflection response when the plates 26, 28 are under compression. The force-deflection response provides a clamping force on the UEA 14, thereby holding the UEA 14 in a desired position, independent of the reactant flow pressures.

The length L of the protuberances 40 is sufficient to contact the bottom of only a single flow channel 36 on the second surface 32 of the plate 28. The resulting bipolar plate assembly 24 has a substantially arcuate cross sectional shape. It is understood that the entire portion of the unbonded plates 26, 28 may be deflected, or a localized portion of the plates 26, 28, such as a non-active area thereof, may be deflected, as desired. The portion of the protuberances 40 abutting the second surface 32 of the plate 28 may cause indentations 44 therein. The size and shape of the indentations 44 will vary based on the size and shape of the protuberances 40 and the amount of compressive force utilized to join plates 26, 28 together during bonding or compression.

When the fuel cell assembly 10 is assembled, the UEA 14 is disposed between the bipolar plate assemblies 22, 24 formed from the bonded plates 26, 28. Since the bipolar plate assemblies 22, 24 have a substantially arcuate shape in the non-active feed regions, the UEA 14 is disposed between and abuts at least the arcuate portion of the bipolar plate assemblies 22, 24, thereby militating against the movement of the UEA 14 during operation of the fuel cell assembly 10. By militating against the movement of the UEA 14 with the arcuate portion of the bipolar plate assemblies 22, 24, an increased coolant flow pressure through the coolant channels 34 to expand the feed regions of the bipolar plate assemblies 22, 24 is not necessitated. The protuberances 40 minimize the variances in the gaps between the bipolar plate assemblies 22, 24 and the flow of the reactants across the bipolar plate assemblies 22, 24 is substantially uniform, thereby increasing an efficiency of operation of the fuel cell assembly.

Figure 4:
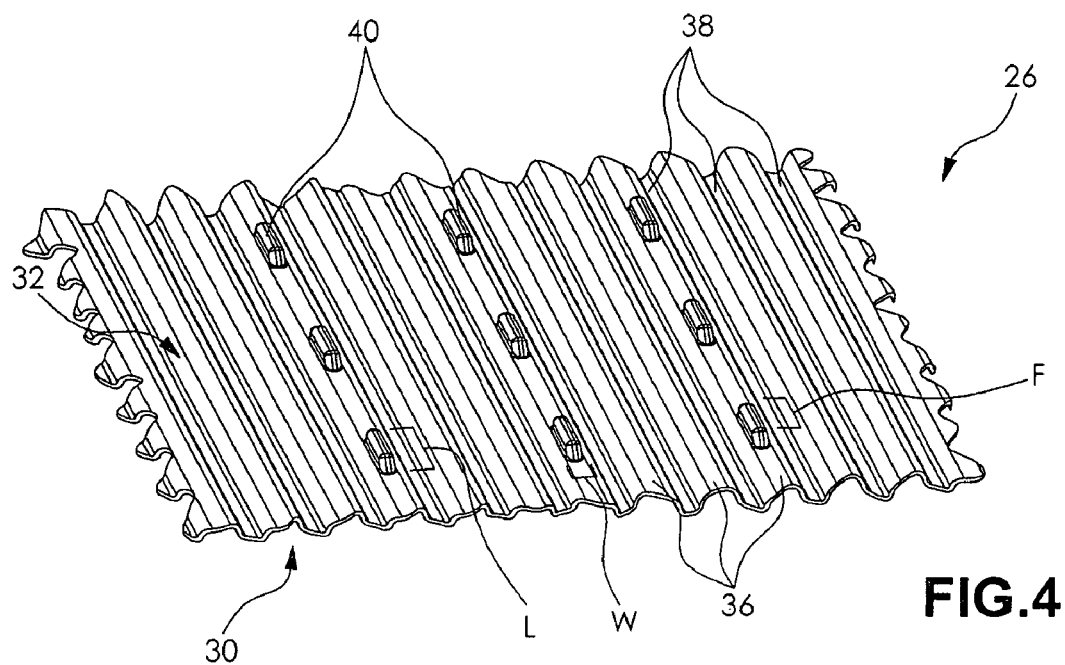
FIG. 4 is an enlarged fragmentary perspective view of protuberances formed on a second surface of a cathode plate of the bipolar plate assembly of FIG. 1.
Figure 5:
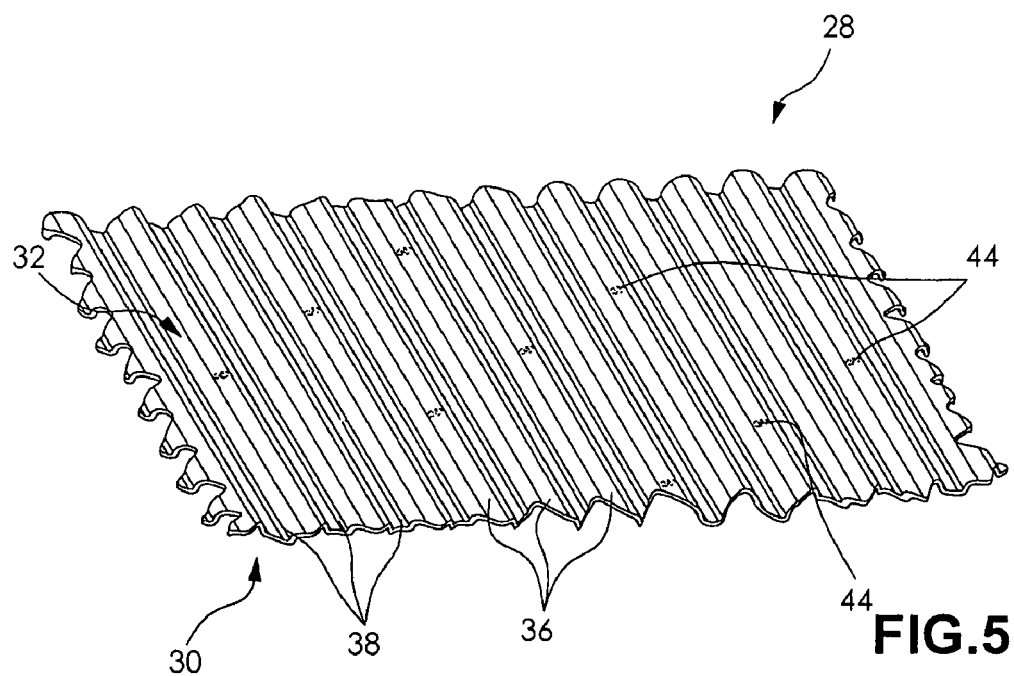
FIG. 5 is an enlarged fragmentary perspective view of indentations formed in a second surface of an anode plate of the bipolar plate assembly of FIG. 1.
Figure 6:
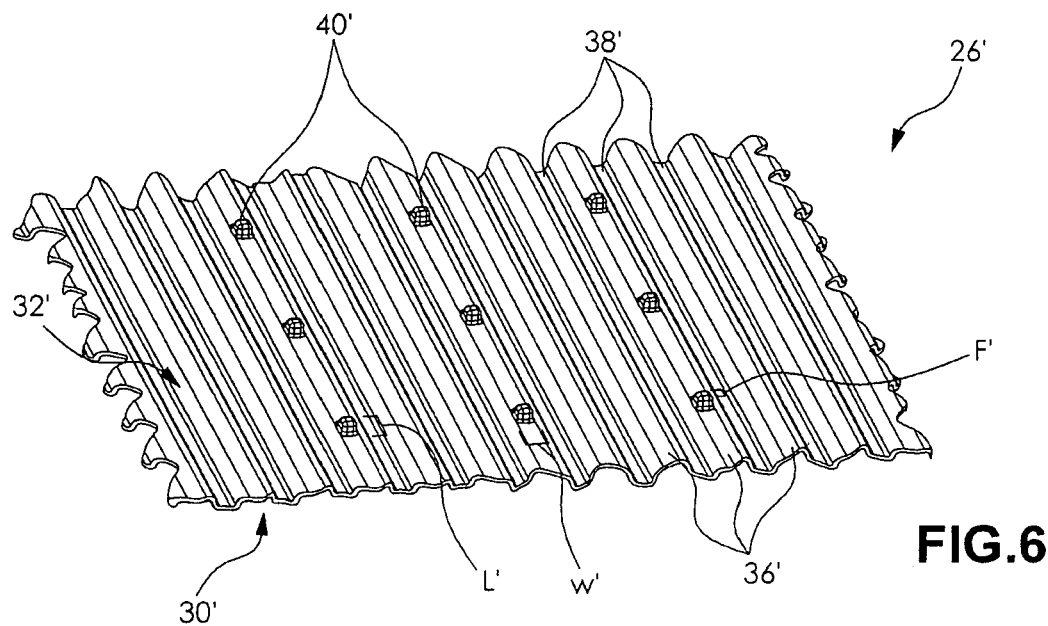
FIG. 6 is an enlarged fragmentary perspective view of protuberances formed on a second surface of a cathode plate of a bipolar plate assembly according to another embodiment of the invention.

FIG. 6 shows an enlarged portion of a fuel cell plate 26' according to an embodiment of the invention similar to the fuel cell plate 26 of FIG. 4 except as described below. Like structure repeated from FIG. 2, FIG. 6 includes the same reference numerals and a prime symbol (').

In the embodiment shown in FIG. 6, the plate 26' is a cathode plate. The plate 26' has a first surface 30' and a second surface 32'. The first surface 30' of the plate 26' includes a plurality of flow channels 36' formed thereon with lands 38' formed between adjacent flow channels 36'. The flow channels 36' are substantially linear. However, the flow channels 36' may be substantially undulated, serpentine, or have other configurations, as desired. Outer peripheral edges of the second surface 32' of the plate 26' are bonded to outer peripheral edges of a second plate (not shown) to form coolant channels between the plate 26' and the second plate. The plate 26' and the second plate may be bonded together by any conventional means such as by welding or by the application of an adhesive, for example. The plate 26' and the second plate may be unbonded, as desired. The plate 26' and the second plate may be formed from any conventional material such as graphite, a carbon composite, and a stamped metal, for example.

The second surface 32' of the plate 26' has a plurality of protuberances 40' formed thereon. If the plate 26' is formed from a metal, the protuberances 40' are formed in a bottom of the flow channels 36' of the plate 26' during a stamping process of the sheet metal forming the plate 26', or the protuberances 40' may be formed on the plate 26' after the formation thereof. For non-metal plates 26', the protuberances 40' are formed on the bottom of the flow channels 36' after the plate 26' is formed. The protuberances 40' have a substantially trapezoidal shape and a length L' substantially equal to a width W'. The protuberances 40' may have any shape as desired. In the embodiment shown in FIGS. 6, the length L' of the protuberances 40' is approximately 0.930 mm, the width W' of the protuberances 40' is substantially equal to a width of the flow channels 36', and a flat portion F' of the protuberances 40' has a length of 0.150 mm. It is understood that any number of protuberances 40' may be formed on the plate 26', as desired. Because the length L' of the protuberances 40' is approximately equal to the width of the bottom of the flow channels of the second fuel cell plate, the protuberances 40' do not extend into the coolant channels.

When the outer peripheral edges of the plate 26' are aligned with the outer peripheral edges of the second plate prior to the bonding or compression thereof, the flow channels 36' formed on the first surface 30' of the plate 26' are substantially perpendicular to flow channels formed on a first surface of the second plate. The longitudinal axis of each of the protuberances 40' is substantially perpendicular to the longitudinal axis of each of the bottoms of the flow channels on the second surface of the second plate. As the outer peripheral edge is bonded to the outer peripheral edge of the second plate during assembly of a fuel cell assembly, the protuberances 40' abut the bottom of the flow channels of the second surface of the plate perpendicular thereto, thereby exerting a force on the second surface of the second plate and deflecting the unbonded portion of the second plate outwardly and away from the protuberances 40'. Simultaneously, the second surface of the second plate exerts a force on the protuberances 40', thereby deflecting the unbonded portion of the plate 26' outwardly and away from the second plate. The resulting bipolar plate assembly has a substantially arcuate cross sectional shape. The geometry of the protuberances 40' may be designed to result in an increasing force-deflection response when the plates 26', 28' are under compression. The force-deflection response provides a clamping force on a UEA, thereby holding the UEA in a desired position, independent of the reactant flow pressures.

Figure 7:
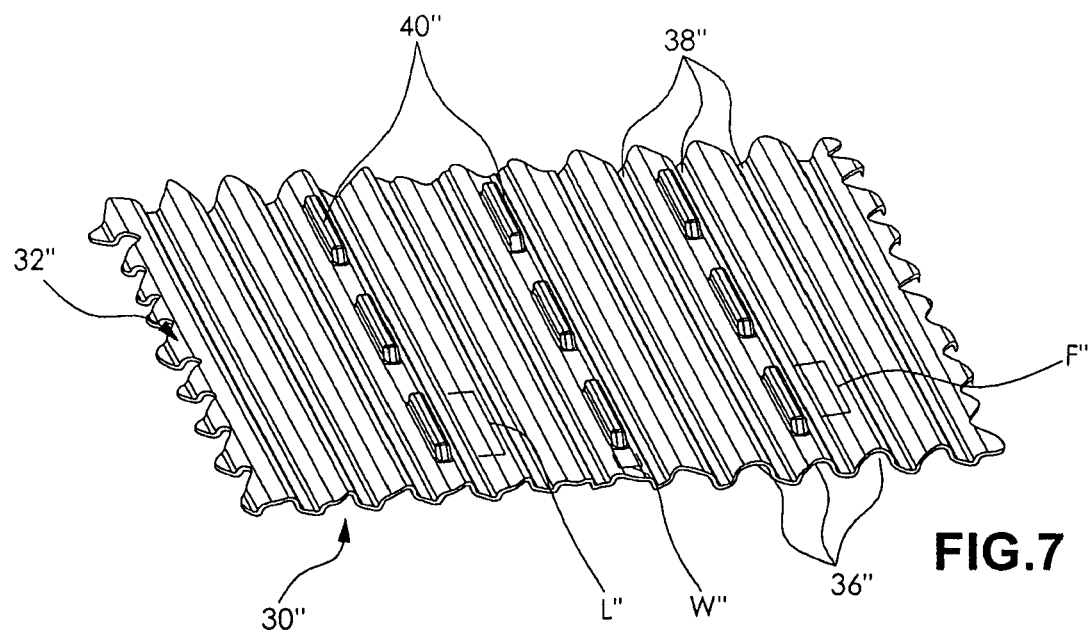
FIG. 7 is an enlarged fragmentary perspective view of protuberances formed on a second surface of a cathode plate of a bipolar plate assembly according to another embodiment of the invention.

FIG. 7 shows a portion of a fuel cell plate 26" according to an embodiment of the invention similar to the fuel cell plate 26 of FIG. 4 except as described below. Like structure repeated from FIG. 4, FIG. 7 includes the same reference numerals and a double prime symbol (").

In the embodiment shown, the plate 26" is a cathode plate. The plate 26" has a first surface 30" and a second surface 32". The first surface 30" of the plate 26" includes a plurality of flow channels 36" formed thereon with lands 38" formed between adjacent flow channels 36". As shown in FIG. 7, the flow channels 36" are substantially linear. However, the flow channels 36" may be substantially undulated, serpentine, or have other configurations, as desired. Outer peripheral edges of the second surface 32" of the plate 26" are bonded to outer peripheral edges of a second plate (not shown) to form coolant channels between the plate 26" and the second plate. The plate 26" and the second plate may be bonded together by any conventional means such as by welding or by the application of an adhesive, for example. The plate 26" and the second plate may be unbonded, as desired. The plate 26" and the second plate may be formed from any conventional material such as graphite, a carbon composite, and a stamped metal, for example.

The second surface 32" of the plate 26" has a plurality of protuberances 40" formed thereon. If the plate 26" is formed from a metal, the protuberances 40" are formed in a bottom of the flow channels 36" of the plate 26" during a stamping process of the sheet metal forming the plate 26", or the protuberances 40" may be formed on the plate 26" after the formation thereof. For non-metal plates 26", the protuberances 40" are formed on the bottom of the flow channels 36" after the plate 26" is formed. A longitudinal axis of the protuberances 40" is substantially parallel to a longitudinal axis of each of the flow channels 36" of the plate 26". The protuberances 40" extend from the bottom of the flow channels 36" into the coolant channels formed between the plate 26" and the second plate. In the embodiment shown in FIG. 7, the protuberances 40" have a substantially trapezoidal shape and a length L" greater than a width W". It is understood that the protuberances 40" may have any shape as desired. In the embodiment shown in FIG. 7, the length L" of the protuberances 40" is approximately 3.330 mm, the width W" of the protuberances 40" is substantially equal to a width of the flow channels 36", and a flat portion F" of the protuberances 40" has a length of 2.550 mm. It is understood that any number of protuberances 40" may be formed on the plate 26", as desired.

When the outer peripheral edge of the plate 26" is aligned with the outer peripheral edge of the second plate prior to the bonding thereof, the flow channels 36" formed on the first surface 30" of the plate 26" are substantially perpendicular to flow channels formed on a first surface of the second plate. The longitudinal axis of each of the protuberances 40" is substantially perpendicular to the longitudinal axis of each of the bottoms of the flow channels on the second surface of the second plate. As the outer peripheral edge is bonded to the outer peripheral edge of the second plate during assembly of a fuel cell assembly, the protuberances 40" abut the bottom of the flow channels of the second surface of the plate perpendicular thereto, thereby exerting a force on the second surface of the second plate and deflecting the unbonded portion of the second plate outwardly and away from the protuberances 40". Simultaneously, the second surface of the second plate exerts a force on the protuberances 40", thereby deflecting the unbonded portion of the plate 26" outwardly and away from the second plate. The length L" of the protuberances 40" is sufficient to contact the bottom of a plurality of flow channels of the second plate. The resulting bipolar plate assembly has a substantially arcuate cross sectional shape. The geometry of the protuberances 40" may be designed to result in an increasing force-deflection response when the plates 26", 28" are under compression. The force-deflection response provides a clamping force on a UEA, thereby holding the UEA in a desired position, independent of the reactant flow pressures.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A bipolar fuel cell plate assembly comprising:
   a first plate having a first surface with a plurality of flow channels formed thereon and a second surface;
   a second plate having a first surface with a plurality of flow channels formed thereon and a second surface, wherein the plurality of flow channels on the first plate is substantially perpendicular to the plurality of flow channels on the second plate;
   a plurality of protuberances formed in a bottom of the flow channels of said first plate, wherein said protuberances abut a bottom of the flow channels of said second plate when said first plate and said second plate are disposed adjacent to one another;
   wherein the bipolar fuel cell plate assembly has a substantially arcuate cross sectional shape.

2. The bipolar fuel cell plate assembly of claim 1, wherein said protuberances are formed in one of said first plate, said second plate, and both said first plate and said second plate during a stamping process.

3. The bipolar fuel cell plate assembly of claim 1, wherein said protuberances are formed on said first plate, said second plate, and both said first plate and said second plate after the plate has been formed.

4. The bipolar fuel cell plate assembly of claim 1, wherein said protuberances have a length greater than a width.

5. The bipolar fuel cell plate assembly of claim 4, wherein the length is in a range from about 0.20 mm to about 3.330 mm.

6. The bipolar fuel cell plate assembly of claim 1, wherein each of said protuberances has a length sufficient to contact the bottom of a plurality of the flow channels of said second plate.

7. The bipolar fuel cell plate assembly of claim 1, wherein said protuberances have a length substantially equal to a width.

8. The bipolar fuel cell plate assembly of claim 1, wherein said protuberances are adapted to provide an increasing force-deflection response when said first plate and said second plate are under compression.

9. A bipolar fuel cell plate assembly comprising:
   a first plate having a first surface with a plurality of flow channels formed thereon and a second surface;
   a second plate having a first surface with a plurality of flow channels formed thereon and a second surface, wherein the plurality of flow channels on the first plate is substantially perpendicular to the plurality of flow channels on the second plate;
   a plurality of protuberances formed in a bottom of the flow channels of said first plate, said protuberances having a length greater than a width, wherein said protuberances abut a bottom of the flow channels said second plate when said first plate and said second plate are disposed adjacent to one another;
   wherein the bipolar fuel cell plate assembly has a substantially arcuate cross sectional shape.

10. The bipolar fuel cell plate assembly of claim 8, wherein said protuberances have a length greater than a width.

11. The bipolar fuel cell plate assembly of claim 9, wherein the length is in a range from about 0.20 mm to about 3.330 mm.

12. The bipolar fuel cell plate assembly of claim 8, wherein each of said protuberances has a length sufficient to contact the bottom of one of the flow channels of said second plate.

13. The bipolar fuel cell plate assembly of claim 8, wherein said protuberances have a length substantially equal to a width.

14. The bipolar fuel cell plate assembly of claim 8, wherein each of said protuberances has a length sufficient to contact the bottom of a plurality of the flow channels of said second plate.

15. The bipolar fuel cell plate assembly of claim 8, wherein said protuberances are adapted to provide an increasing force-deflection response when said first plate and said second plate are under compression.

16. A fuel cell assembly comprising:
   a fuel cell stack including a plurality of fuel cell plates, each fuel cell plate formed from a first plate having a plurality of flow channels and a plurality of surfaces and a second plate having a plurality of flow channels and a plurality of surfaces, wherein the plurality of flow channels on the first plate is substantially perpendicular to the plurality of flow channels on the second plate; and
   a plurality of protuberances formed in a bottom of the flow channels of said first plate, wherein said protuberances abut a bottom of the flow channels of said second plate when said first plate and said second plate are disposed adjacent to one another;
   wherein the fuel cell plate has a substantially arcuate cross sectional shape.

17. The fuel cell assembly of claim 16, wherein said protuberances are formed in said first plate, said second plate, and both said first plate and said second plate during a stamping process.

18. The fuel cell assembly of claim 16, wherein said protuberances have a length greater than a width.

19. The fuel cell assembly of claim 18, wherein the length is in a range from about 0.20 mm to about 3.330 mm.

20. The fuel cell assembly of claim 16, wherein each of said protuberances has a length sufficient to contact the bottom of a plurality of the flow channels of said second plate.

* * * * *